United States Patent
Larsson et al.

(10) Patent No.: US 8,599,007 B2
(45) Date of Patent: Dec. 3, 2013

(54) DISPENSER AND ROLL OF FLEXIBLE SHEET MATERIAL

(75) Inventors: Bjorn Larsson, Billdal (SE); Robert Kling, Skene (SE)

(73) Assignee: SCA Hygiene Products AB, Gothenburg (SE)

( * ) Notice: Subject to any disclaimer, the term of this patent is extended or adjusted under 35 U.S.C. 154(b) by 0 days.

(21) Appl. No.: 13/807,782

(22) PCT Filed: Jul. 2, 2010

(86) PCT No.: PCT/EP2010/059456
§ 371 (c)(1),
(2), (4) Date: Dec. 31, 2012

(87) PCT Pub. No.: WO2012/000560
PCT Pub. Date: Jan. 5, 2012

(65) Prior Publication Data
US 2013/0099924 A1 Apr. 25, 2013

(51) Int. Cl.
*G08B 26/00* (2006.01)
*B65H 18/28* (2006.01)
(52) U.S. Cl.
USPC ............ 340/505; 340/572.8; 242/160.4; 242/560.1; 242/600
(58) Field of Classification Search
USPC .......... 340/505, 568.1, 571, 572.1, 572.4, 340/572.8; 235/383, 385, 487; 242/160.4, 242/560.1, 564.4, 600; 700/231, 237, 240
See application file for complete search history.

(56) References Cited

U.S. PATENT DOCUMENTS

| | | | |
|---|---|---|---|
| 4,882,568 A | 11/1989 | Kyser et al. | |
| 4,901,663 A | 2/1990 | De Luca | |
| 5,294,192 A * | 3/1994 | Omdoll et al. | 242/560.1 |
| 5,604,992 A | 2/1997 | Robinson | |
| 6,653,940 B2 * | 11/2003 | Collura | 340/572.8 |
| 7,077,073 B2 | 7/2006 | Judge | |
| 8,165,716 B1 * | 4/2012 | Goeking et al. | 700/237 |
| 2003/0019899 A1 | 1/2003 | Chen et al. | |
| 2003/0078691 A1 | 4/2003 | Holt et al. | |
| 2003/0167893 A1 | 9/2003 | Morris et al. | |
| 2006/0006275 A1 | 1/2006 | Neveu et al. | |
| 2008/0048064 A1 * | 2/2008 | Lemaire et al. | 242/560.1 |
| 2009/0177315 A1 * | 7/2009 | Goeking et al. | 700/231 |
| 2011/0168827 A1 * | 7/2011 | Cooper | 242/160.4 |

FOREIGN PATENT DOCUMENTS

| | | |
|---|---|---|
| DE | 93 15 604.9 | 2/1994 |
| DE | 94 16 976.4 | 12/1994 |
| DE | 200 13 470 | 12/2000 |
| EP | 0 933 054 | 8/1999 |
| FR | 2 590 149 | 5/1987 |

* cited by examiner

Primary Examiner — Van T. Trieu
(74) *Attorney, Agent, or Firm* — Drinker Biddle & Reath LLP

(57) ABSTRACT

A dispenser for dispensing flexible sheet material includes a roll of material, the roll of material having a core. One end portion of the flexible sheet material is adhered to the core by a pickup glue. The dispenser includes a sensor for sensing the pickup glue of the roll of material and a control unit for triggering at least one action of the dispenser in response to the detection of the pickup glue.

15 Claims, 2 Drawing Sheets

DISPENSER AND ROLL OF FLEXIBLE SHEET MATERIAL

CROSS-REFERENCE TO PRIOR APPLICATION

This application is a §371 National Stage Application of PCT International Application No. PCT/EP2010/059456 filed Jul. 2, 2010, which is incorporated herein in its entirety.

TECHNICAL FIELD

The present application pertains to a dispenser for dispensing flexible sheet material from a roll of material, in particular for dispensing tissue paper towels from a roll of material, and to a roll of flexible sheet material.

BACKGROUND

In the field of dispensing flexible sheet material from a roll of material, in particular tissue paper towels or tissue toilet paper, different dispenser types are known. In particular, manual dispensers are known in this field which are operated by the respective user by manually pulling the tissue paper towels or tissue toilet paper out of the dispenser. Electric dispensers are also known in this field which dispense the paper towels in reaction to a trigger signal which is used to control an electric motor for feeding the paper. The trigger signal is typically provided by a sensor which senses the presence of a hand of a user, or by a sensor which senses that a towel has just been removed from a dispenser.

Irrespective of whether a manual or electric dispenser is used, one of the issues that are to be considered when designing dispensers of the roll-type arises when the actual roll is about to be depleted and needs to be replaced by a new, full roll. Unlike paper dispensers which dispense stacks of folded tissue paper and which can be easily refilled simply by placing additional paper on top of the almost depleted paper stack, such an easy refill is not available for rolls. In fact, when using rolls, the refilling situation dramatically changes because rolls can only be replaced as a whole.

In particular, for a dispenser which is designed for a single roll of material, the service personnel which services the respective premises needs to be alerted in a timely manner to replace the almost depleted roll of material in order to make sure that the users of the respective bathroom are always in a position to dry their hands or to have a sufficient supply of toilet paper available.

For dispensers which are designed to hold two or more rolls of material, namely the actually dispensed roll of material and replacement roll(s), a replacement roll needs to replace a depleted roll at the right timing. In particular, a triggering mechanism which is responsible for replacing the depleted roll has to be reliable, such that the exchange of rolls is carried out smoothly and at an efficient and economically sensible timing. In particular, for economical and ecological reasons, it is desirable to fully use-up a roll of material before the replacement roll is set in place to be dispensed.

In order to accomplish this and in order to determine when the roll is depleted and needs to be replaced, US 2003/0078691 A1 suggests counting the number of rotations of the roll and calculate from this the actual usage of the dispensed paper. However, it becomes immediately apparent that, in order to be in a position to correctly calculate the amount dispensed on the basis of the rotations and to determine from this information the actual filling status of the roll, the dimensions of the roll as well as those of the material need to be accurately known. In particular, the calculation is extremely sensitive to small deviations in the thickness of the material, to the diameter of the winding core, and to the actual length of the paper on this particular roll. Accordingly, the set-up suggested in this publication needs to be supplied with quite a number of data for each type of paper.

In U.S. Pat. No. 4,901,663, a different solution is suggested, according to which printed marks are provided to the end face of the towel roll. On the basis of these marks, the upcoming end of the roll can be determined. However, the step of printing marks onto the end face of the roll requires additional equipment and yet another step in the manufacturing process of the paper, because the marks can only be printed onto the end face after the log has been cut into individual rolls.

SUMMARY

Accordingly, it is desired to provide a dispenser for dispensing flexible sheet material from a roll, as well as a roll of material which improve the reliability of the dispensing action.

According to the solution of claim 1, a dispenser for dispensing flexible sheet material from a roll of material is provided, the roll having a core, wherein one end portion of the flexible sheet material is adhered to the core by means of a pickup glue. The dispenser includes a sensor for sensing the pickup glue and a control unit for triggering at least one action of the dispenser in response to the detection of the pickup glue.

The dispenser according to this concept has the advantage that by sensing the pickup glue, the respective actions of the dispenser such as, for example, replacing the depleted roll by a fresh one, or alerting the service personnel of the upcoming depletion of the current roll, can be reliably carried out. In particular, by sensing the pickup glue of the roll of material, complicated mechanisms and computations can be avoided and the dispensing system is, with respect to the detection of the roll end, fully independent of the paper quality, the diameter of the core and the length of the paper on a fresh roll. Accordingly, the end of the paper of the roll and, thus, the upcoming depletion can be reliably sensed.

The pickup glue is used for attaching one end portion of the sheet material to the core of the roll in order to allow for reliable winding of the sheet material to the roll during its manufacture. Accordingly, pickup glue is always present in the rolls of material and will become accessible when the roll of material is about to be depleted.

In a preferred embodiment, a detectable substance is included in the pickup glue and this detectable substance can be detected by the sensor. Because this pickup glue is used for carrying the substance which is to be detected, this system does not require additional steps in the manufacturing process of the rolls except using a pickup glue which includes the detectable substance.

In particular, the detectable substance has to be added to the pickup glue such that it can be detected by the sensor in the dispenser. Because the pickup glue typically bleeds/diffuses through the last few windings of a wound roll, the sensor can detect the detectable substance in the pickup glue that has bled through the layers on the end portion of the flexible sheet material as well as on the core as such.

Because the pickup glue is present in the last few windings of the flexible sheet material, the detectable substance is also present in these last few windings. This means that the last portion of the flexible sheet material which is unwound from the roll carries the detectable substance.

Additional steps for the application of this marker in the roll are not necessary. Furthermore, because the pickup glue is necessarily present in every roll, the system can be setup in an extremely reliable manner, without the need for additional information with regard to the paper that is to be dispensed or the specific format of the roll. In other words, sensing the detectable substance is completely independent of the geometry of the dispenser as well as of the dimensions of the roll.

As the detectable substance, different substances are contemplated which are available for detection by a sensor. In particular, it is contemplated adding a metallic substance to the pickup glue such that a sensor sensing a change in the inductive and/or conductive properties of the roll can be used. Furthermore, a magnetic substance can be added to the pickup glue such that a sensor sensing a change in the magnetic properties of the roll can be used. An electrically conductive substance can be added to the glue such that a sensor sensing a change in the conductive properties of the roll can be used. A colouring substance and/or a fluorescent substance can be added to the pickup glue such that a change in colour or fluorescence can be detected by the sensor and/or a sensor in the form of a camera. A radioactive substance can be added to the pickup glue such that the sensor senses the respective radiation.

In addition, or as an alternative, the change of sound emitted when the paper approaches its end and the paper bearing the pickup glue is unwound from the roll can be determined and this change of sound be used as the sensing signal. Some signal processing might be necessary to get rid of the ambient sounds.

A capacitive sensor can be used which senses the change of capacity of the roll when the pickup glue is present in the paper. For using this capacitive sensor, the presence of an additional detectable substance is not obligatory but the presence of the regular pickup glue alone might change the capacitance because the pickup glue serves as a dielectric such that a change in capacity can be sensed.

In particular embodiments, the dispensing mechanism includes drive rollers and the sensor is situated upstream of the drive rollers, i.e. between the roll to be dispensed and the drive rollers, such that the end portion of the flexible sheet material can be sensed by the sensor before the end portion of the flexible sheet material slips through the drive rollers. By means of this arrangement of the sensor, it can be reliably detected when the roll is about to be depleted.

In addition, or as an alternative, the sensor can also be arranged in the proximity of the core of the roll such that it can detect the instance when only the core is left, by detecting the detectable substance in the pickup glue that remains on the core.

The sensor may also be situated close to, or at the actual dispensing opening through which the flexible sheet material is dispensed.

In particular embodiments, the sensor is sensitive to a change of color and/or to fluorescent material and/or to magnetic properties and/or to inductive properties and/or to capacitive properties and/or to resistive properties and/or to acoustic properties and/or to radiation properties and/or to conductive properties of the pickup glue and/or a detectable substance in the pickup glue. In particular, the sensor can be provided in the form of a photosensor and/or a magnetic sensor and/or a camera and/or a capacitive sensor and/or an acoustic sensor and/or a resistive sensor and/or a radiation sensor and/or an inductive sensor and/or a UV-light sensitive sensor such that the movement of the flexible sheet material along the sensor and the presence of the detectable substance on or in the flexible sheet material actually triggers the sensor.

Other sensors and detectable substances are also contemplated as long as the detectable substance can be applied to the roll by means of the pickup glue and/or the properties of the pickup glue can be modified accordingly in order to achieve reliable sensing by a sensor.

In particular embodiments, the control unit is configured to trigger certain actions of the dispenser once the upcoming depletion of a roll is sensed. These actions include, for example, replacing a roll of material by a replacement roll or awakening other systems of the dispenser which are only needed once a roll is depleted, for example an acoustical, optical or data system which alerts the service personnel of the upcoming depletion of the roll. The respective signal can also be sent to a different unit in order to alert service personnel in a remote location, for example to a storage room or a staff room.

A solution to the above-mentioned is also provided in the form of a roll of flexible sheet material which includes the flexible sheet material as such, as well as a core onto which the flexible sheet material is wound. The end portion of the flexible sheet material is glued to this core by means of pickup glue wherein this pickup glue is detectable by a sensor of the dispenser described above.

The pickup glue includes a detectable substance in the form as discussed above. The detectable substance is a color substance and/or a magnetic substance and/or a metallic substance and/or a radioactive substance and/or a conductive substance and/or a fluorescent substance. The detectable substance is, however, not limited to these substances but extends to all detectable substances which can be included in a pickup glue of the type described in order to achieve triggering of a sensor.

The pickup glue is, in a certain embodiment, present in or on several inner windings of the roll of material, in particular in the innermost 2 to 5 windings, typically the last 45 cm of the sheet material when it is being unwound.

BRIEF DESCRIPTION OF THE FIGURES

The present disclosure will be described in more detail below, with reference to the Figures, in which.

DETAILED DESCRIPTION OF PREFERRED EMBODIMENTS

Figure 1:
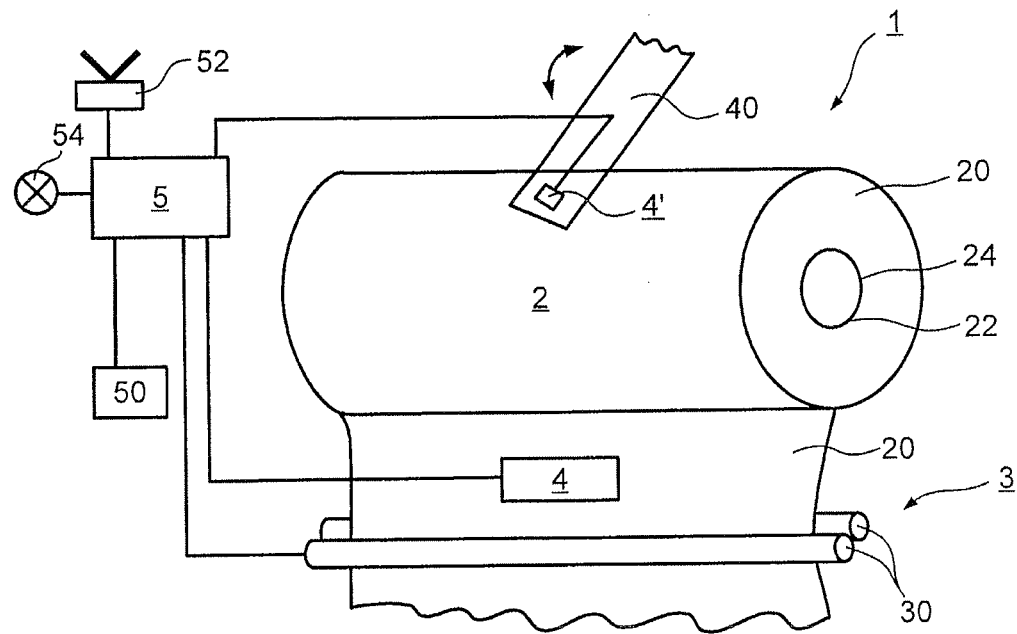
FIG. 1 is a schematic view of a dispenser.

In the following, an embodiment of a dispenser for dispensing tissue paper towels as well as embodiments of rolls of material according to the present disclosure will be described by reference to the attached Figures. Identical or similar features will be denoted by the same reference numerals and repeated description thereof may be omitted in order to avoid redundancies.

Even though the embodiment shown is for a dispenser for tissue paper towels, the invention is not limited to this type of dispensers but is intended for all types of dispensers for dispensing flexible sheet material such as, for example, dispensers for tissue paper towels, dispensers for tissue toilet papers or dispensers for kitchen towels, just to name a few.

FIG. 1 schematically shows a dispenser 1, the dispenser including a roll of material 2 and a dispensing mechanism 3. Various technical solutions which are known in the art are contemplated for the actual mounting mechanism for mounting roll 2 which carries paper 20 wound around a core 22. Various mechanisms which are known in the art are also contemplated for the dispensing mechanism 3.

In the embodiment shown, the dispensing mechanism 3 is provided in the form of two drive rollers 30 which may be driven by a motor (not shown). The dispensing action is triggered, for example, by an external sensor 50 at the outside of the dispenser housing. This external sensor may be an inductive sensor or a photosensor, sensing the presence of the hand of a user. In response to the trigger signal, the dispensing mechanism 3 dispenses a sheet of material from the roll 2 such that a user may dry her or his hands.

A sensor 4 for sensing the end of paper is schematically shown in FIG. 1. The sensor 4 is situated between the dispensing mechanism 3 and the roll 2. This sensor 4 is preferably provided in the form of a photosensor or an inductive sensor, such that it can sense a detectable substance present on or in the paper 20 of roll 2, in particular in an end portion thereof. Naturally, any type of sensor—or combination of sensors—in the form as described and discussed above can be used. The detectable substance that is provided to the paper 20 at its end portion is a detectable substance which was added to the pickup glue of the roll 2.

Such a detectable substance can be, for example, a color substance, a fluorescent substance, a magnetic substance or a metallic substance which enables using a photodetector and/or an inductive sensor as the sensor 4. Other combinations of detectable substances and sensors are, of course, contemplated and may be advantageous for further improving the reliability.

The arrangement of the sensor 4 shown in FIG. 1, namely substantially in the middle between the two longitudinal sides of the paper 20, has the advantage that only the detectable substance present on or in the paper 20 is detected and the sensor is not influenced by any environmental effects. In other words, the sensor 4 in this position detects the "pure" signal of the detectable substance.

In an alternative embodiment, the sensor 4 may be situated more closely towards the core 22 of the roll 2 such that it does not measure the presence of the detectable substance on the dispensed paper 20, but rather on the core 22 itself.

In yet another embodiment, the sensor 4' is provided in direct contact with the outer surface of the roll 2 via a pivotable arm 40. As soon as the sensor 4 comes into contact with the detectable substance of the pickup glue, be it on the last windings of the paper 20 of the roll 2 or be it on the core 22 alone, it detects the presence of the detectable substance.

In a modification, more than one sensor 4 can be present across the width of the paper and/or along the length of the unwinding direction of the paper in order to enhance the detection accuracy and/or the signal-to-noise ratio of the signal provided by the sensors. The plurality of sensors 4 can also be present on a single, or a plurality of pivotable arms.

It is furthermore contemplated using different types of sensors in a single dispenser, for example an inductive sensor and a light sensor for sensing colours. Naturally, any combination of sensors which improves the accuracy, efficiency and/or versatility of the detection can be used.

A control unit 5 is present, which is connected to the sensor 4 and which triggers at least one action of the dispenser in response to the detection of the detectable substance. This action of the dispenser could be, for example, exchanging of the almost or fully depleted roll such that the stub roll/the depleted core 22 is automatically removed and a new roll is inserted in its place automatically. This mechanism is typical for systems which hold, besides the roll that is actually dispensed, at least another replacement roll.

Another action that could be triggered by the control unit 5 would be alerting the service personnel of the upcoming depletion of the roll 2 by means of a lamp or LED 54 which is lit or a sound emitted from a loudspeaker 52.

In another preferred embodiment, a signal is sent to a remote unit which may be mounted to a staff room or a storage room or to a mobile unit such as a beeper or mobile telephone in order to alert service personnel of the upcoming depletion of a roll even when they are not physically present at the dispenser in question.

Figure 2:
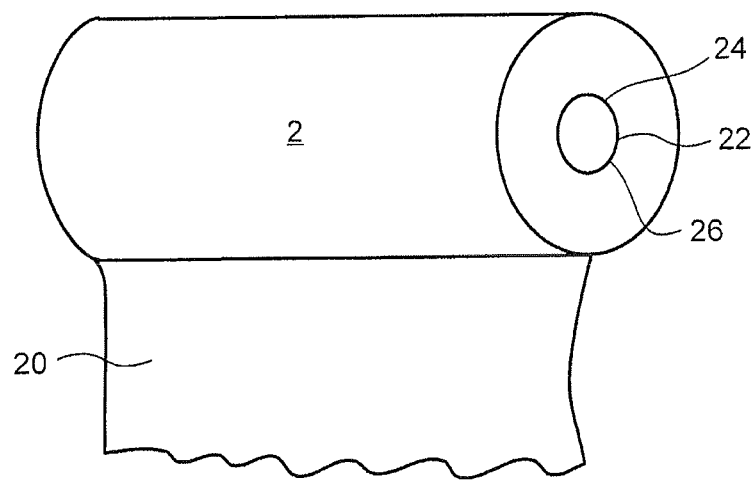
FIG. 2 is a schematic view of a roll of material.

FIG. 2 schematically shows a roll of material 2 in which paper 20 is wound around a core 22. In order to be in a position to efficiently manufacture such a roll, it is necessary that the end that is to be wound onto the core 22 is attached to the core 22 in a reliable manner. Pickup glue 24 is used for this purpose, wherein the core 22 is provided with the pickup glue 24 on its outside and then the paper 20 to be wound around the core 22 is fed to the core 22. By means of the pickup glue 24, the end portion 26 of the paper is taken up and attached to the core 22. The pickup glue 24 typically bleeds/diffuses through some of the innermost windings of the paper 20 at the beginning of the winding process.

In order to achieve reliable attachment of the end of the paper to the core, a sufficient amount of pickup glue needs to be applied to the core. An amount of 4-5 g per meter glue string of pickup glue could be used, as an example, in this respect, wherein the pickup glue typically is cellulose based or starch based and may be a combination of cellulose derivatives or starch polymers with polyvinyl alcohol. The amount of pickup glue mentioned above could also be provided to the end portion of the flexible sheet material alone, or to the core as well as to the end portion.

To the pickup glue 24, a detectable substance may be added such that the detectable substance is present not only on the core 22 but also in the last few windings of the paper 20 of roll 2, in particular approximately in the last 45 cm of the paper. Such a detectable substance can be, for example, a color substance and/or a fluorescent substance and/or a magnetic substance and/or a conductive substance and/or a metallic substance which enables using a photodetector and/or an inductive sensor or any other suitable sensor as the respective sensor 4. Combinations thereof are, of course, contemplated and might prove advantageous to improve the accuracy in detecting the end of paper.

It is contemplated to use an amount of pickup glue 24 which is sufficient to attach the end portion 26 to the core 22 and which is sufficient to make sure that the pickup glue 24 reliably bleeds through the first few windings during manufacture of the roll 2. In an alternative, the pickup glue could be provided to selected portions of the core only.

It is apparent that the actual amount of pickup glue used depends on the specific properties of the paper which is to be wound onto the roll, on the properties of the pickup glue itself as well as on the properties of the detectable substance. It is also contemplated not only to provide the pickup glue onto the core but also to apply the pickup glue to the end portion of the paper before it is picked up. The pickup glue may be sprayed and/or applied via a roll, for example an annilox roll. The ultimate aim is to provide a sufficient amount of pickup glue such that it reliably bleeds through the innermost windings of the paper such that it can be detected as soon as the last few windings of the paper are in the process of being dispensed.

Schematically, a dispensing process is carried out by inserting a fresh roll into a dispenser 1 and dispensing paper from it in the usual way. However, as soon as the roll is almost depleted, the very last windings of the paper 20 are dispensed.

However, these very last windings of paper 20 also include traces of the detectable substance which was present in the pickup glue, because the pickup glue bled through the very last windings of the paper.

As the sensor 4 can detect the detectable substance on the paper, it will do so and the control unit triggers the respective actions of the dispenser on this basis, such as, for example, replacing the depleted core with a fresh one or alerting the service personnel of the upcoming depletion of the roll.

Figure 3A:
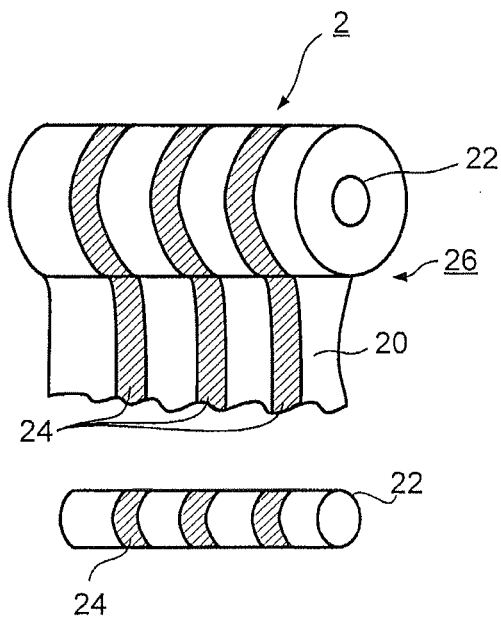
FIGS. 3a to 3c are schematic views of exemplary patterns according to which the pickup glue may be applied to the core.

FIG. 3a shows an embodiment of a roll of material 2 with a core 22 which is provided with a pickup glue 24 in stripes which are provided around the core 22 and in the end portion 26 of the sheet material. Accordingly, the paper 20 which is wound onto the core 22 is also provided with the pickup glue 24 in stripes which extend along the winding direction. The amount of pickup glue which is to be used shall be sufficient such that it bleeds through the first few windings of the paper around the core 22 when the paper is wound around the core during its manufacture.

Figure 3B:
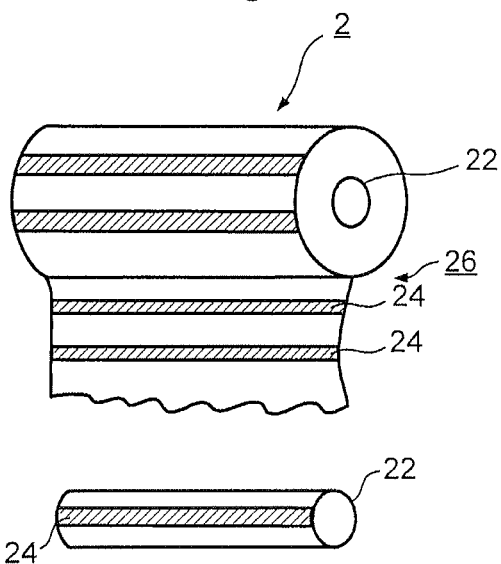

FIG. 3b shows another possibility of applying the pickup glue 24 to the core 22. According to this embodiment, the pickup glue 24 will be present in the last windings of the roll in a line extending across the width of the paper 20. This embodiment might be specifically efficient when using sensors which sense the change of certain characteristics because two instances of abrupt change can be detected for every line when viewed in the winding direction, namely the change from the pickup glue-free paper to the pickup glue-bearing paper, and the change from the pickup glue-bearing paper to the pickup glue-free paper again.

Figure 3C:
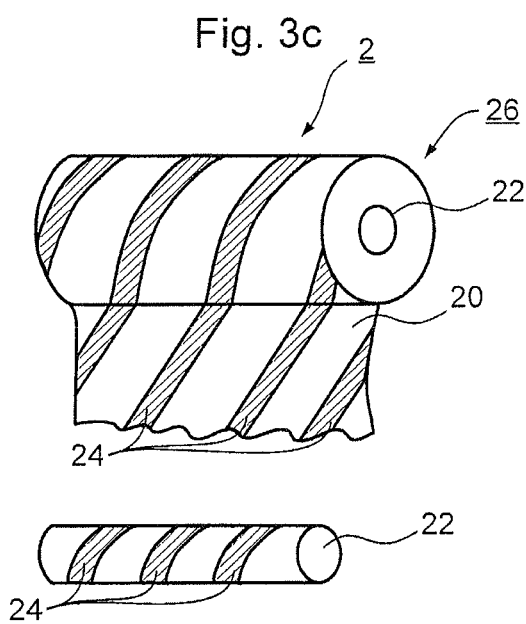

FIG. 3c shows an embodiment according to which the pickup glue 24 is applied to the core in a helix-manner, resulting in inclined lines on the paper.

Of course, the pickup glue can also be applied all over the entire surface of the core 22 and/or surface of the sheet material on its end portion 26.

The invention claimed is:

1. A dispenser for dispensing flexible sheet material from a roll of material, comprising a roll of material having a core, wherein one end portion of the flexible sheet material is adhered to the core by a pickup glue, the dispenser further comprising:
   a sensor for sensing the pickup glue of the roll of material; and
   a control unit for triggering at least one action of the dispenser in response to the detection of the pickup glue.

2. The dispenser according to claim 1, wherein the dispenser includes a dispensing mechanism for dispensing the sheet material from the roll.

3. The dispenser according to claim 1, wherein the dispenser has at least two drive rollers and the sensor is situated upstream of the drive rollers relative to the flow of dispensing the flexible sheet material.

4. The dispenser according to claim 1, wherein the sensor is arranged in the proximity of the core.

5. The dispenser according to claim 1, wherein the sensor is situated on an arm which is arranged to follow the outer surface of the roll.

6. The dispenser according to claim 1, wherein the sensor is arranged to sense a detectable substance in the pickup glue.

7. The dispenser according to claim 6, wherein the detectable substance in the pickup glue includes a metallic substance, a magnetic substance, a conductive substance, a coloured substance, a fluorescent substance, or a radioactive substance, or any combinations thereof.

8. The dispenser according to claim 6, wherein the sensor is arranged to detect the detectable substance on the core of the roll.

9. The dispenser according to claim 1, wherein the sensor is an acoustical sensor, an inductive sensor, a magnetic sensor, a capacitive sensor, a resistive sensor, a conductive sensor, a light sensor, a camera, a UV light sensitive sensor, or a radiation sensor, or any combinations thereof.

10. The dispenser according to claim 1, wherein the control unit is configured to trigger a replacement of a core by a full roll of flexible sheet material in response to sensing of the detectable substance, to awaken other systems, or to trigger actions to alert the service personnel of the upcoming depletion of the roll, or any combinations thereof.

11. The dispenser according to claim 10, wherein the control unit is configured to trigger actions to alert the service personnel of the upcoming depletion of the roll in a remote location.

12. The dispenser according to claim 1, wherein more than one sensor is provided.

13. A roll of flexible sheet material comprising:
   flexible sheet material; and
   a core onto which the flexible sheet material is wound,
   wherein one end portion of the flexible sheet material is glued to the core by a pickup glue,
   wherein the pickup glue is detectable by a sensor,
   wherein the pickup glue includes a detectable substance which is detectable by the sensor, and
   wherein the detectable substance is a metallic substance, a magnetic substance, a conductive substance, a coloured substance, a fluorescent substance, or a radioactive substance, or any combinations thereof.

14. The roll of material according to claim 13, wherein the pickup glue is at least partially present in the last windings of the flexible sheet material of the roll of material.

15. The roll of material according to claim 13, wherein the pickup glue is at least partially present in the last 45 cm of the flexible sheet material of the roll of material.

* * * * *